United States Patent [19]

Woodroffe

[11] Patent Number: 5,068,879
[45] Date of Patent: Nov. 26, 1991

[54] MONITORING OF DIGITAL TRANSMISSION SYSTEMS

[75] Inventor: Brian W. Woodroffe, Edinburgh, Scotland

[73] Assignee: Hewlett Packard Company, Palo Alto, Calif.

[21] Appl. No.: 325,628

[22] Filed: Mar. 20, 1989

[30] Foreign Application Priority Data

Mar. 22, 1988 [EP] European Pat. Off. ........ 88302479.6

[51] Int. Cl.$^5$ .............................................. H01L 7/04
[52] U.S. Cl. ..................................... 375/115; 375/118
[58] Field of Search ................................. 375/118–120, 375/106, 115, 116; 370/105.3, 107

[56] References Cited

U.S. PATENT DOCUMENTS 4,737,971 4/1988 Lanzafame et al. ................ 375/118

OTHER PUBLICATIONS

Hewlett-Packard Journal, vol. 27, No. 7, Mar. 1976, pp. 18–24, Palo Alto, US; I. Young et al.: "A 50-Mbit/s Pattern Generator and Error Detector for Evaluating Digital Communications System Performance".
Hewlett-Packard Journal, vol. 27, No. 7, Mar. 1976, p. 9, left-hand column, lines 1–17.

*Primary Examiner*—Douglas W. Olms
*Assistant Examiner*—Marianne Huseman
*Attorney, Agent, or Firm*—Edward L. Miller

[57] ABSTRACT

An arrangement for monitoring slip in a digital transmission system. A PRBS sequence is transmitted in one channel or timeslot of the system. At a receiving station a characteristic group of N bits of the received sequence is assembled. The assembled group is compared with locally formed groups of N bits which would be expected to occur if a slip has occurred.

5 Claims, 2 Drawing Sheets

MONITORING OF DIGITAL TRANSMISSION SYSTEMS

This invention relates to digital transmission systems and in particular relates to the monitoring of such systems.

In digital transmission systems, digital data is transmitted typically between telephone exchanges. At the source end, data is clocked out onto a telephone line under the control of a clock associated with the source exchange. At the receive end, data is fed into (i.e. a suitable data structure in a memory data structure in a memory) an elastic store (i.e., a suitable under the control of clock signals derived from the transmitted data stream. Data is then fed out from the elastic store under the control of a local clock in the source exchange. The elastic store is provided so that it can accommodate any phase difference between the clocks of the two exchanges. However, problems arise when there are differences in the frequencies of the two clocks. If there are such differences then the elastic store will either fill up or become empty depending upon the direction of the difference.

An elastic store in a transmission system operating typically at 1.544 Mbit/sec, has a capacity of 192 bits which is the number of bits in a frame. The elastic store can be conceptualized as a circular buffer, which is accessed by two pointers, one of which controls reading into the store and the other of which controls reading out from the store. Thus, data is entered at a location corresponding to one pointer, which is then advanced to the next location, whilst data is extracted under the control of the other pointer, which is then advanced in a similar manner. Initially the pointers are 96 bits apart, i.e. one half frame. The buffer becomes full or empty when the pointers meet, which can occur if the frequencies of the clocks referred to above are not the same. When the pointers cross, the phenomenon known as a controlled slip occurs. If the pointer associated with the incoming data overtakes the pointer associated with the clocking out of data, a whole frame of data is deleted. This is known as negative slip. Conversely if the pointer associated with clocking out of the data overtakes the pointer associated with clocking in of data, then a whole frame of data is duplicated. This is known as positive slip. In either case it is important that such phenomena can be sensed and identified.

There have been various attempts at measurement of slip. A fairly basic technique is to measure the frequency difference between the two clock signals and from this to derive the number of slips per unit time. This method, however, does not indicate the exact instant at which a slip occurs.

Slips can also be measured by sensing the sequencing of data. When a slip occurs, data in each time slot of a frame is deleted or duplicated depending on whether the slip is negative or positive. Because of this, slip measurements need not be made on data within a whole frame, but can be made using data within one time slot of that frame. Thus it is possible to take a single channel out of service and to use that channel to sense slip.

In order to sense slip using this general technique, it is necessary to stimulate in a time slot a data pattern which has the characteristic that its sequence is known. A bit stream that has such a characteristic is a pseudo random binary sequence (PRBS). A PRBS generates a determined bit stream. If a received bit stream is shown to have jumped forward by n bits (assuming an n bit time slot), then a negative slip has occurred. Conversely, if it has jumped backward by n bits then a positive slip has occurred. PRBS streams are used in digital transmission systems to detect errors. It has also been proposed to use such streams to sense slip, although existing methods, which compare the n of bits received in a time slot with the n bits expected if a slip has occurred, can give false slip measurements. This is because the number of bits n used in the comparison is less than the number of bits N which characterise a PRBS. A group of n bits can be repeated in a PRBS and give a false indication of a slip. An object of the present invention is to provide a technique for monitoring slip in digital transmission arrangements, which does not have such problems.

According to the present invention there is provided apparatus for monitoring slip in a digital transmission system, in which digital data is received in a store and re-aligned to a local clock, said apparatus comprising means for receiving said data from said store and for accumulating a characteristic group of N successive bits of a PRBS sequence transmitted with said data, means for forming groups of N bits of a PRBS sequence which would be expected in the event of a slip, and means for comparing the accumulated N bits with said groups of predicted bits.

The group of N bits may be accumulated from N-n PRBS bits of a first slot (n bits per time slot) and n PRBS bits of the next succeeding time slot. The accumulation and generation of expected values may be carried out by a processor. The expected PRBS bits may be generated using a look-up table technique.

The invention will be described now, by way of example only, with particular reference to the accompanying drawings. In the drawings.

Figure 1:
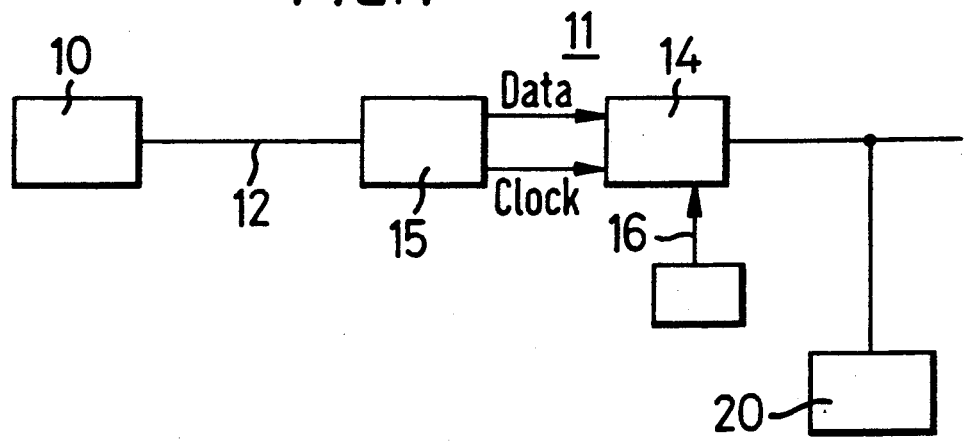
FIG. 1 is a block schematic diagram showing a digital transmission arrangement and an apparatus for monitoring slip in accordance with the present invention.

A digital transmission system typically comprises a source exchange 10, which is coupled to a receiving exchange 11 by a telephone line 12. Data is clocked out from the source exchange 10 onto the telephone line 12 under the control of a clock at the source end. At the receive exchange, data is fed into an elastic store 14 via a circuit 15 which extracts clock signals from the incoming data to generate write control signals for controlling the writing of data into the store 14. The data is then fed out from the elastic store 14 under the control of clock signals generated from a local clock 16 in the receiving exchange.

Apparatus for measuring slip in the transmission arrangement is shown generally at 20. It can be implemented using a processor which has the capability of generating PRBS sequences.

Digitally encoded data is typically generated and transmitted in frames, each of which comprises a number of time slots or channels. In the present technique, one of these time slots is taken out of service and used to transmit a PRBS sequence from the source exchange 10. Such a facility is usually available in a transmission arrangement, since it is known to use PRBS's for the detection of errors. The apparatus 20 is designed to monitor the received PRBS sequence by forming from that incoming sequence what is called a PRBS state vector which is a group of N bits which characterizes that incoming PRBS. The apparatus compares that state vector with locally generated values of similar such state vectors which would be expected to occur in the event of a slip. On the basis of this comparison the apparatus can produce an appropriate indication when a slip is indicated.

PRBS's comprises $2^N-1$ bits and are uniquely characterised by a group of N bits. By looking at any group of N bits, it is possible to identify the position of that group of bits in the PRBS sequence. Typically PRBS's used in digital data transmission systems are either $2^{9-1}$, i.e. 511, or $2^{11-1}$, i.e. 2047 bits in length. Such sequences are uniquely characterised either by 9 or 11 bits. Only by looking at the characteristic number of bits can the sequence be unambiguously characterized. In digital data transmission systems there are typically 8 bits per channel. Thus, by looking at the 8 bits of a channel it is not possible to uniquely characterize the PRBS sequence. This is because sequences of fewer bits than the 9 or 11 will occur multiple times within the PRBS sequence. Furthermore, PRBS's will generate 8 bit sequences that run consecutively. Thus, slip cannot be sensed simply by comparing an 8 bit time slot of a frame with predicted values for the 8 bits on either side of that time slot.

The apparatus 20 overcomes this problem by tracking the last 9 bits (N=9) of the received PRBS fed out from the elastic store 15 and compares those 9 bits with the 9 bits that would be expected if slip has occurred. Thus the apparatus 20 has to generate: (1) the previous 9 PRBS bits to check for negative slips, (2) the next 9 PRBS bits to check for positive slips and (3) in addition the current 8 bits for error counting.

The apparatus 20 compares the last 9 bits of the received PRBS and if it finds identity with either of the predicted values, generates an output indicating a negative or a positive slip. Appropriate action can then be taken in response to such a slip measurement.

Figure 2:
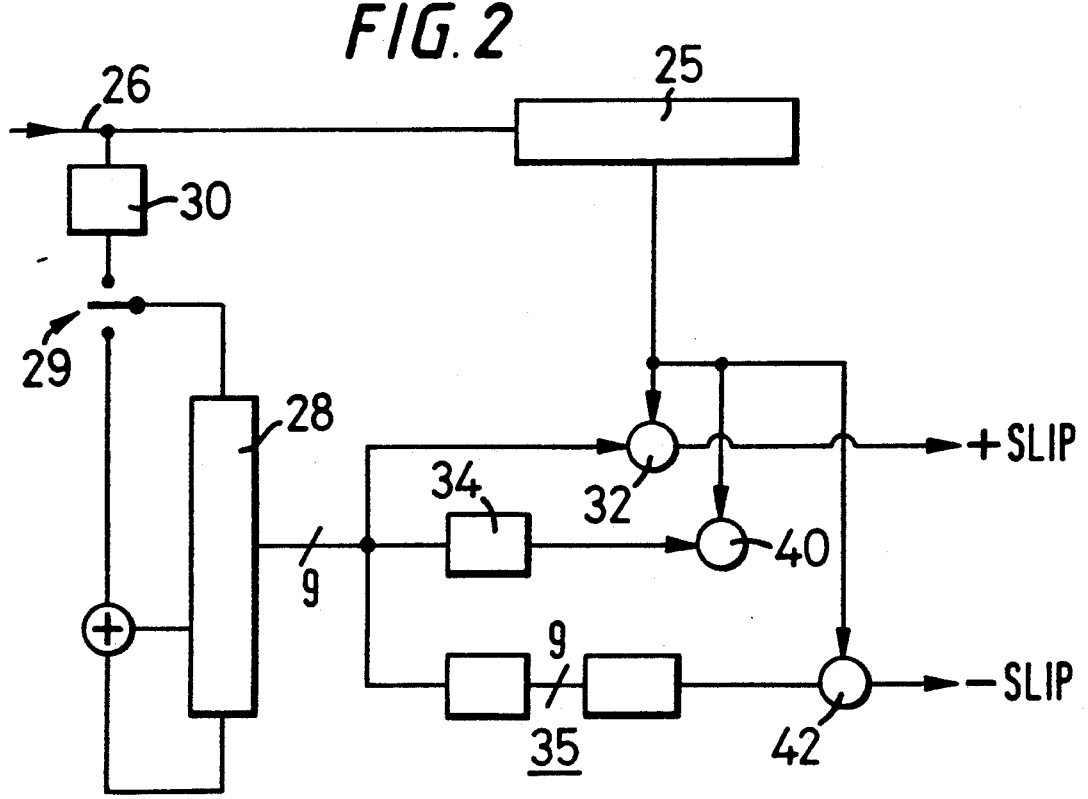
FIG. 2 illustrates one implementation of slip monitoring apparatus.

FIG. 2 shows schematically one implementation of the apparatus 20. The apparatus comprises a shift register 25 for storing the 9 bit PRBS state vector formed from the incoming PRBS fed out from the elastic store onto line 26. The apparatus also includes a PRBS generator 28 which is coupled to the line 26 by a switch 29 and a delay element 30. The output from the generator 28 is connected to a bitwise comparator 32, which is arranged to compare that output with the contents of the register 25, a circuit 34 which receives the current PRBS state and predicts its value after 8 clock periods and a circuit 35 which receives the current PRBS state and predicts its value after 16 clock periods (2 frames). The output of the circuit 34 is applied to a comparator 40 which is arranged to compare that output with the contents of the shift register 25 and the output of the circuit 35 is applied to a bitwise comparator 42 which is arranged to compare that output with the contents of the shift register 25.

In use the switch 29 is initially set to its upper position, as seen in FIG. 2. This enables the generator 28 to be trained or aligned to the incoming bit stream. It should be noted that it is trained so that it is in the state that the bit stream was in n clock periods (where n is usually 8) previously, i.e. it is phase shifted with respect to the bit stream. The switch 29 is then set to its lower position so that the generator 28 is set to its feedback mode. Incoming bits are collected in the shift register 25. A frame is known to have been duplicated (positive slip) if the contents of the shift register 25 and the contents of the PRBS register are equal. This is sensed by the comparator 32 which produces an output indicative of positive slip.

To determine if a frame has been deleted (negative slip) the circuit 35 calculates a PRBS state vector as if 2n bits (two frames) had arrived. The comparator 42 produces an output in the event of negative slip.

The apparatus 20 can alternatively be a processor with the capability of generating PRBS's using a look-up table technique. The processor operates to form a 9 bit PRBS state vector from the incoming stream, computes state vectors which would be expected if positive or negative slip had occurred and makes a comparison of the state vector with the expected values to sense if slip has occurred.

The algorithm which is used to control the operation of the processor, is as follows. The algorithm assumes:

there are 8 PRBS bits per time slot; i.e. 64 kbit/s, the PRBS is 511, $(2^{9-1})$. [adjustments are possible for 56 kbit/s and an 11 stage PRBS].

Algorithm is as follows:

```
read in 8 bits; save the youngest bit.
read in 8 bits; merge with the saved bit to form the
"PRBS_state_vector",
save the youngest bit.
loop_point:
read in 8 bits; form a 9-bit state vector "This_PRBS_
state".
if This_PRBS_state = PRBS_state_vector then
a positive slip has occurred
goto loop_point
endif
PRBS_state_vector :- next(PRBS_state_vector)
count bit wise differences between the received 8
bit word
and the least significant 8 bits of the PRBS_
state_vector.
This count is the error count.
```

This count is the error count.

```
if This_PRBS_state = next(PRBS_state_vector)
a negative slip has occurred
PRBS_state_vector :- This_PRBS_state.
goto loop_point
endif
```

In this algorithm next(state) represents a function/-macro which given a PRBS state predicts what the PRBS state will be after 8 clock periods. The way in which PRBS's can be generated by a processor is described later.

It will be noted that the above algorithm includes an error detecting step. It should be noted that the presence of errors can affect the slip measurement. The presence of error can change any pattern to any other pattern and therefore can affect the algorithm used to control the operation of the processor. In the present arrangement when a slip is recognised it does not require gaining of a new PRBS alignment. The unique 9 bits that synchronise the PRBS has already been determined for the slip measurement. Therefore when a slip has been detected the algorithm immediately takes up the new alignment. If a slip had been simulated by errors in the bit stream, this algorithm immediately recognises this and reports a slip of the opposite direction. Since the frequencies of the two clocks are never that different, genuine slips will be infrequent. Therefore if two slips are reported consecutively it is apparent that a slip has been seen as a result of line errors. In this case a slip reading can be suppressed if required.

The following example will illustrate how this algorithm can work for an arrangement in which there are 8 data bits per byte and in which a 9 stage PRBS is used. The example shows 4 successive groups of 8 bits where there is no slip where there is positive slip and where there is negative slip.

|  | → time → | | | |
|---|---|---|---|---|
|  | oldest/first received | | youngest/last received | |
|  | byte 1 | byte 2 | byte 3 | byte 4 |
| 0 slip | AAAAAAAA | BBBBBBBB | CCCCCCCC | DDDDDDDD |
| + slip | aaaaaaaa | bbbbbbbb | bbbbbbbb | cccccccc |
| − slip | aaaaaaaa | bbbbbbbb | dddddddd | eeeeeeee |
|  |  | ∧ T0 |  | ∧ T1 |

At T0 alignment to the PRBS is accomplished using the last two received bytes; the PRBS state is bbbbbbba; N-many B's time in the bit stream (above) runs from left to right, it is convention to for PRBS state to show the least-significant (newest) bit on the right and therefore in a register representation time runs from right to left.

Therefore at T0, two bytes have been received and processed; the PRBS state will have been determined from the last n (8) bits from the latest frame and the previous N-n (1) bits to make 9 bits in all; i.e. BBBBBBBBA.

At T1 the next two bytes will have been received. The current PRBS state is determined using the received PRBS state and predicting it's value after 16 bits.

If it is equal to the state received then no slip has occurred. Besides predicting the state after 16 clock periods, the state is predicted for both 8 and 24 clock periods hence.

If the received vector equals either then a slip (of the appropriate kind) has occurred; and as a slip is known to have occurred the local PRBS state can be updated immediately without another training sequence (of the kind noted at time T0).

Figure 3:
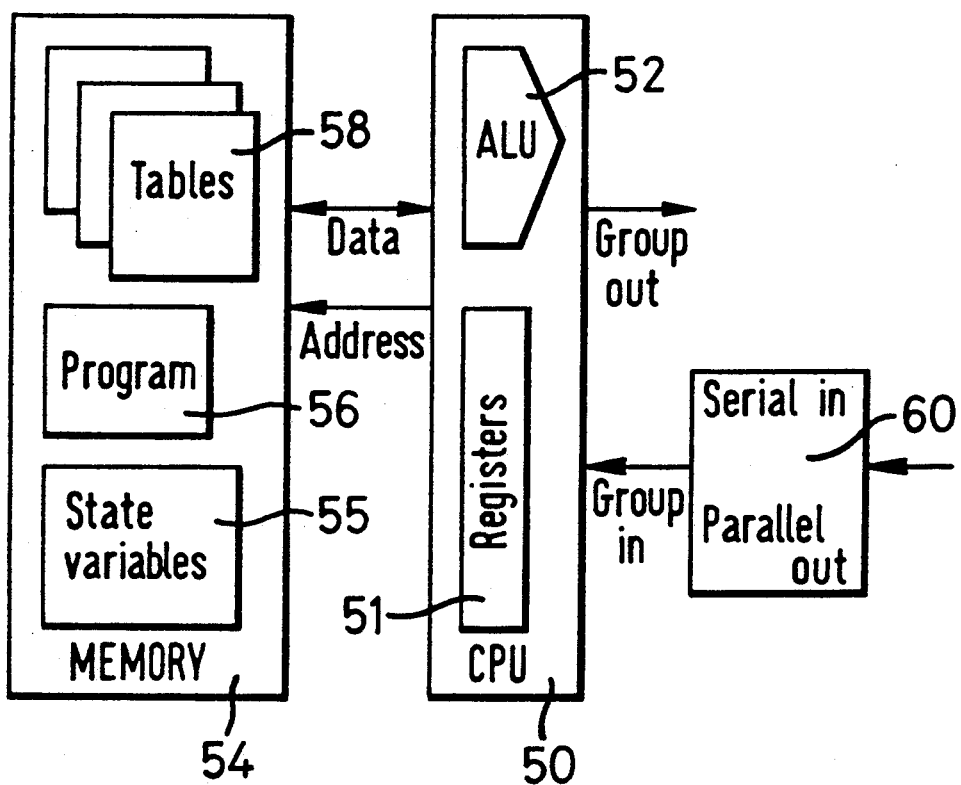
FIG. 3 shows how a processor based embodiment may generate PRBS's.

FIG. 3 shows how the processor can generate PRBS's using a look-up table technique. The Figure shows a central processing unit 50 with base and index registers shown generally at 51 and an arithmetic logic unit 52. Associated with the central processing unit 50 is a memory 54. Stored within the memory are state variables shown generally at 55, programs 56 and a series of tables shown at 58. Within the tables 58 are stored the digits of one or more PRBS's. These digits are stored as groups or words which typically will have, seven or eight digits per group. Groups of digits can be read out from the memory in response to address signals generated by the control processing unit 50.

Data can be fed to the central processing unit via a serial in-parallel out register 60.

In operation when the processor is set to generate a PRBS, an address is generated so that a first group of digits is read from the tables 58. The number of digits or bits within each group is defined by the number of data bits which occur in a timeslot. This group of bits is also used to determine the address for the next group of bits which is required in the PRBS. In effect what happens is that the state defining value of the PRBS is advanced a number of states per read operation. It will be appreciated that it is not desirable for the software to determine each individual state. What the software does is to identify the next group of digits in a single operation. This is achieved by associating with each given state, the state that will be present after eight clocks. This can be done by the table. The store value in itself used to find the next state and hence the successive states.

The arrangement of FIG. 3 shows the base and index registers contained in the CPU 10. It will be appreciated that placement depends upon the associated architecture and it is not necessary for the registers to be in the central processing unit for the algorithm to operate.

I claim:

1. Apparatus for monitoring slip in a digital transmission system or the like that receives digital data, stores it in a memory and outputs it in synchronism with a local clock signal, the apparatus comprising:

memory means for storing receiving digital data;

first means, coupled to the memory means and responsive to the received digital data stored therein, for accumulating and storing a first group of N successive bits of a first PRBS sequence that is part of the received digital data stored in the memory means, N being an integer that is sufficiently large that N successive bits characterize the PRBS sequence, and also for producing at a first output signals indicative of the first group of N successive bits;

second means, coupled to the memory means and responsive to the received digital data stored therein, for generating a second PRBS sequence at least at one time identical to the first PRBS sequence and also for producing from the second PRBS sequence at second, third and fourth outputs, signals indicative of second, third and fourth groups of N successive bits, the second, third and fourth groups respectively indicative of a negative slip, no slip and a positive slip; and comparison means coupled to the first, second, third and fourth outputs, for comparing the first group N successive bits with each of the second, third and fourth groups of N successive bits.

2. Apparatus as in claim 1 wherein the digital transmission system divides the received digital data into a plurality of n-bit bit time slots each of which periodically occurrs in sequence, n being an integer less than or equal to N, and wherein the first group of N successive bits is accumulated from N−31 n bits of a first time slot and n bits of the next succeeding time slot.

3. Apparatus as in claim 1 or 2 wherein the first means and the second means comprise a processing means for executing a stored program.

4. Apparatus as in claim 3 wherein the processing means includes look-up tables for generating the second, third and fourth groups of N successive bits.

5. A method of monitoring slip in a digital transmission system or the like that receives digital data, stores it in a memory and outputs it in synchronism with a local clock signal, the method comprising the steps of:

receiving a PRBS sequence transmitted with the digital data;

accumulating from the received PRBS sequence a characteristic group of N successive bits;

generating a local PRBS sequence initially in agreement with the received PRBS sequence;

forming groups of N successive bits of the local PRBS sequence that would be expected to arise from the accumulating step in the absence of a slip and in the event of a slip; and comparing the group of N successive bits of the accumulating step with each of the groups of N successive bits formed by the forming step.

* * * * *